(12) United States Patent
Maheshwari et al.

(10) Patent No.: US 8,228,860 B2
(45) Date of Patent: Jul. 24, 2012

(54) OFFSET TIME FOR RANGING REQUEST MESSAGES

(75) Inventors: Shashikant Maheshwari, Irving, TX (US); Haihong Zheng, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 453 days.

(21) Appl. No.: 12/554,557

(22) Filed: Sep. 4, 2009

(65) Prior Publication Data

US 2010/0061354 A1    Mar. 11, 2010

Related U.S. Application Data

(60) Provisional application No. 61/095,443, filed on Sep. 9, 2008.

(51) Int. Cl.
*H04W 4/00* (2009.01)

(52) U.S. Cl. .................. 370/329; 370/338; 370/341

(58) Field of Classification Search .............. None
See application file for complete search history.

(56) References Cited

U.S. PATENT DOCUMENTS

| | | | |
|---|---|---|---|
| 6,570,857 B1 * | 5/2003 | Haartsen et al. | 370/312 |
| 6,987,982 B2 | 1/2006 | Willenegger et al. | |
| 7,505,776 B2 * | 3/2009 | Ryu et al. | 455/458 |
| 8,032,159 B2 * | 10/2011 | Wu et al. | 455/458 |
| 2009/0170535 A1 * | 7/2009 | Ryu et al. | 455/458 |
| 2010/0008324 A1 * | 1/2010 | Lee et al. | 370/331 |
| 2010/0291921 A1 * | 11/2010 | Ruuska et al. | 455/426.1 |

OTHER PUBLICATIONS

Hamiti, Shkumbin, "The Draft IEEE 802.16m System Description Document", Nokia, IEEE 802.16 Broadband Wireless Access Working Group, Jul. 29, 2008, 89 pages.

Maheshwari, Shashikant, "Draft #3, SDD Text Proposal by AHG Chair for Idle Mode", Idle Mode Ad-hoc Group Chair, IEEE 802.16 Broadband Wireless Access Working Group, Sep. 3, 2008, 6 pages.

* cited by examiner

*Primary Examiner* — Chi Pham
*Assistant Examiner* — Soon-Dong Hyun
(74) *Attorney, Agent, or Firm* — Brake Hughes Bellermann LLP

(57) ABSTRACT

Various example embodiments are disclosed. According to an example embodiment, a method may include sending, by a base station in a wireless network, a paging message to a mobile station, the paging message identifying the mobile station. The method may also include receiving, at an offset time after the sending the paging message, a ranging request message from the mobile station, the offset time being based at least in part on an identifier of the mobile station.

17 Claims, 9 Drawing Sheets

OFFSET TIME FOR RANGING REQUEST MESSAGES

PRIORITY CLAIM

This application claims the benefit of priority based on U.S. Provisional Patent Application No. 61/095,443, filed on Sep. 9, 2008, entitled, "Offset Time for Ranging Request Messages," the disclosure of which is hereby incorporated by reference.

TECHNICAL FIELD

This description relates to wireless networks.

BACKGROUND

Mobile stations in wireless networks may not always actively communicate with their respective base stations. Mobile stations may enter an active state upon being paged by the base station.

SUMMARY

According to an example embodiment, a method may include sending, by a base station in a wireless network, a paging message to a mobile station, the paging message identifying the mobile station. The method may also include receiving, at an offset time after the sending the paging message, a ranging request message from the mobile station, the offset time being based at least in part on an identifier of the mobile station.

According to another example embodiment, a method may include switching, by a mobile station in a wireless network, from a paging unavailable mode to a paging available mode in an idle state. The method may also include receiving a paging message from a base station during the paging available mode. The method may also include determining that the paging message identifies the mobile station. The method may also include switching from the idle state to an active state at an offset time after the paging message was received, the offset time being based at least in part on an identifier of the mobile station. The method may also include sending, during the active state and at a time based on the offset time, a ranging request message to the base station.

According to another example embodiment, a method may include sending, by a base station in a wireless network, a paging message to a plurality of mobile stations, the paging message identifying at least two of the plurality of mobile stations and indicating different offset times for each of the at least two mobile stations to send ranging request messages. The method may also include receiving, at the different offset times after the sending the paging message, a ranging request message from each of the at least two mobile stations.

According to another example embodiment, a method may include switching, by a mobile station in a wireless network, from a paging unavailable mode to a paging available mode in an idle state. The method may also include receiving a paging message from a base station during the paging available mode, the paging message indicating an offset time for the mobile station to send a ranging request message. The method may also include determining that the paging message identifies the mobile station. The method may also include switching from the idle state to an active state at a time indicated by the offset time. The method may also include sending, during the active state and at the offset time after the paging message was received, a ranging request message to the base station.

According to another example embodiment, an apparatus may include a controller and a wireless transceiver. The controller may be configured to generate a paging message for a mobile station, the paging message identifying the mobile station, and to process, at an offset time after the sending the paging message, a ranging request message received from the mobile station, the offset time being based at least in part on an identifier of the mobile station. The wireless transceiver may be configured to send the paging message to the mobile station and receive the ranging request message from the mobile station via an air interface.

According to another example embodiment, an apparatus may include a controller and a wireless transceiver. The controller may be configured to switch from a paging unavailable mode to a paging available mode in an idle state, process a paging message received from a base station during the paging available mode, determine that the paging message identifies the apparatus, switch from the idle state to an active state at an offset time after the paging message was received, the offset time being based at least in part on an identifier of the apparatus, and generate, during the active state and at a time based on the offset time, a ranging request message for the base station. The wireless transceiver may be configured to receive the paging message from and send the ranging request message to the base station via an air interface.

According to another example embodiment, an apparatus may include a controller and a wireless transceiver. The controller may be configured to generate a paging message to send to a plurality of mobile stations, the paging message identifying at least two of the plurality of mobile stations and indicating different offset times for each of the at least two mobile stations to send ranging request messages, and to process, at the different offset times after the sending the paging message, a ranging request message from each of the at least two mobile stations. The wireless transceiver may be configured to send the paging message and receive the ranging request message via an air interface.

According to another example embodiment, an apparatus may include a controller and a wireless transceiver. The controller may be configured to switch from a paging unavailable mode to a paging available mode in an idle state, process a paging message received from a base station during the paging available mode, the paging message indicating an offset time for the apparatus to send a ranging request message, determine that the paging message identifies the apparatus, switch from the idle state to an active state at a time indicated by the offset time, and generate, during the active state and at the offset time after the paging message was received, a ranging request message to the base station. The wireless transceiver may be configured to receive the paging message from the base station and send the ranging request message to the base station via the air interface.

According to another example embodiment, a computer program product for paging mobile stations may be tangibly embodied on a computer storage medium and include executable code that, when executed, is configured to cause a base station which serves a plurality of mobile stations to send, by the base station in a wireless network, a paging message to a mobile station, the paging message identifying the mobile station, and receive, at an offset time after the sending the paging message, a ranging request message from the mobile station, the offset time being based at least in part on an identifier of the mobile station.

According to another example embodiment, a computer program product for a mobile station to be paged may be tangibly embodied on a computer storage medium and include executable code that, when executed, is configured to cause the mobile station which is served by a base station to switch, by the mobile station in a wireless network, from a paging unavailable mode to a paging available mode in an idle state, receive a paging message from a base station during the paging available mode, determine that the paging message identifies the mobile station, switch from the idle state to an active state at an offset time after the paging message was received, the offset time being based at least in part on an identifier of the mobile station, and send, during the active state and at a time based on the offset time, a ranging request message to the base station.

According to another example embodiment, a computer program product for paging mobile stations may be tangibly embodied on a computer storage medium and include executable code that, when executed, is configured to cause a base station which serves a plurality of mobile stations to send, by the base station in a wireless network, a paging message to a plurality of mobile stations, the paging message identifying at least two of the plurality of mobile stations and indicating different offset times for each of the at least two mobile stations to send ranging request messages, and receive, at the different offset times after the sending the paging message, a ranging request message from each of the at least two mobile stations.

According to another example embodiment, a computer program product for a mobile station to be paged may be tangibly embodied on a computer storage medium and include executable code that, when executed, is configured to cause the mobile station which is served by a base station to switch, by the mobile station in a wireless network, from a paging unavailable mode to a paging available mode in an idle state, receive a paging message from a base station during the paging available mode, the paging message indicating an offset time for the mobile station to send a ranging request message, determine that the paging message identifies the mobile station, switch from the idle state to an active state at a time indicated by the offset time, and send, during the active state and at the offset time after the paging message was received, a ranging request message to the base station.

The details of one or more implementations are set forth in the accompanying drawings and the description below. Other features will be apparent from the description and drawings, and from the claims.

DETAILED DESCRIPTION

Figure 1:
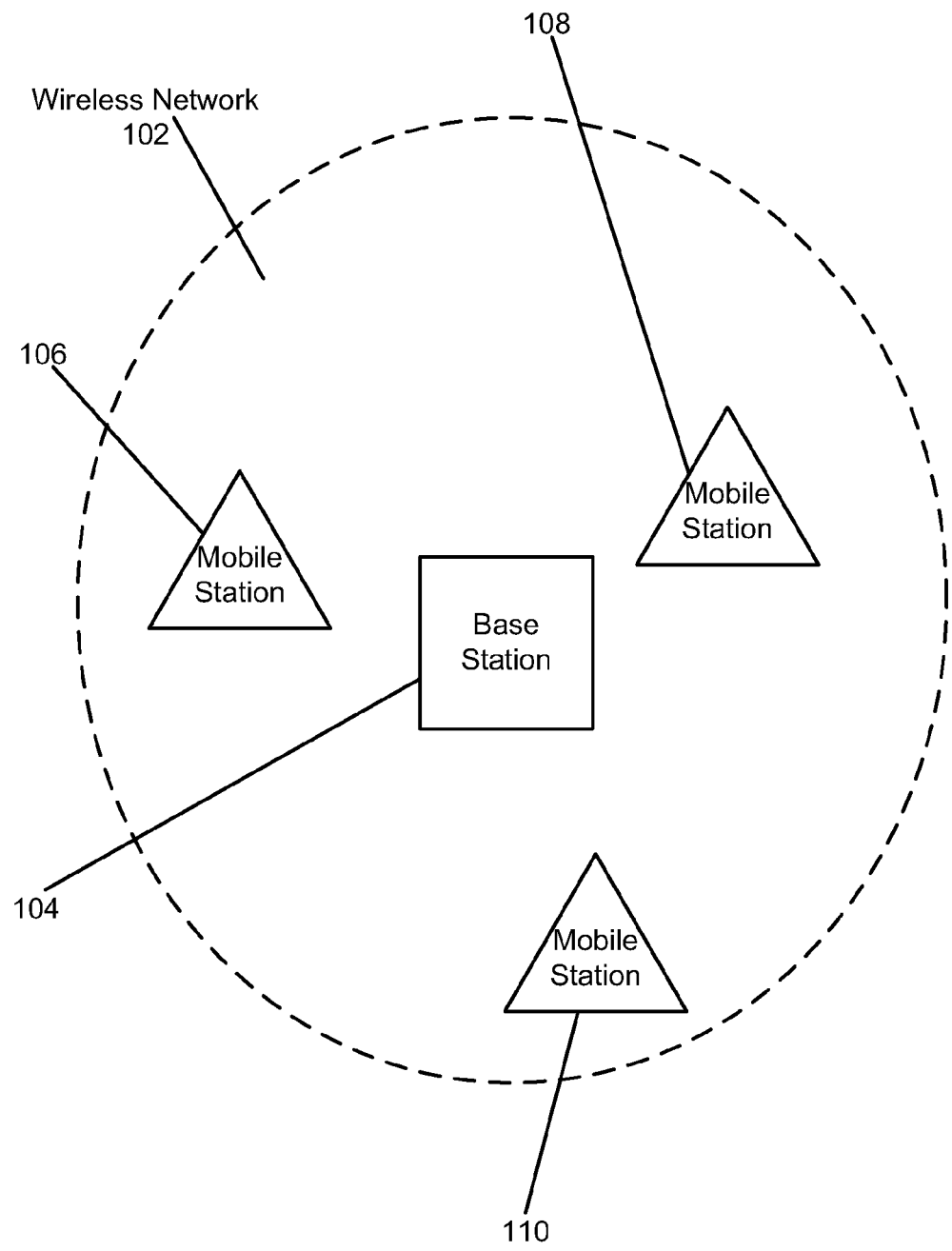
FIG. 1 is a block diagram of a wireless network including a base station and three mobile stations according to an example embodiment.

FIG. 1 is a block diagram of a wireless network 102 including a base station 104 and three mobile stations 106, 108, 110 according to an example embodiment. While only three mobile stations 106, 108, 110 are shown, any number may be provided. Although not shown, mobile stations 106, 108 and 110 may be coupled to base station 104 via relay stations or relay nodes, for example. The wireless network 102 may include, for example, an IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a WiMAX relay station, a node B, an 802.11 access point, or other infrastructure node, according to various example embodiments. The term "base station" (BS) may be used herein and may include any type of infrastructure node, including either a base station or relay station which communicates with a mobile station 106, 108, 110. The mobile stations 106, 108, 110 may include laptop or notebook computers, smartphones, personal digital assistants (PDAs), cellular telephones, WiMAX devices, subscriber stations, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Also, as used herein, the term Orthogonal Frequency Division Multiplexing (OFDM) includes the variation of OFDM known as Orthogonal Frequency Division Multiple Access (OFDMA), where different OFDM subcarriers or channels are assigned to different users. Thus, the term OFDM may include OFDMA.

Figure 2:
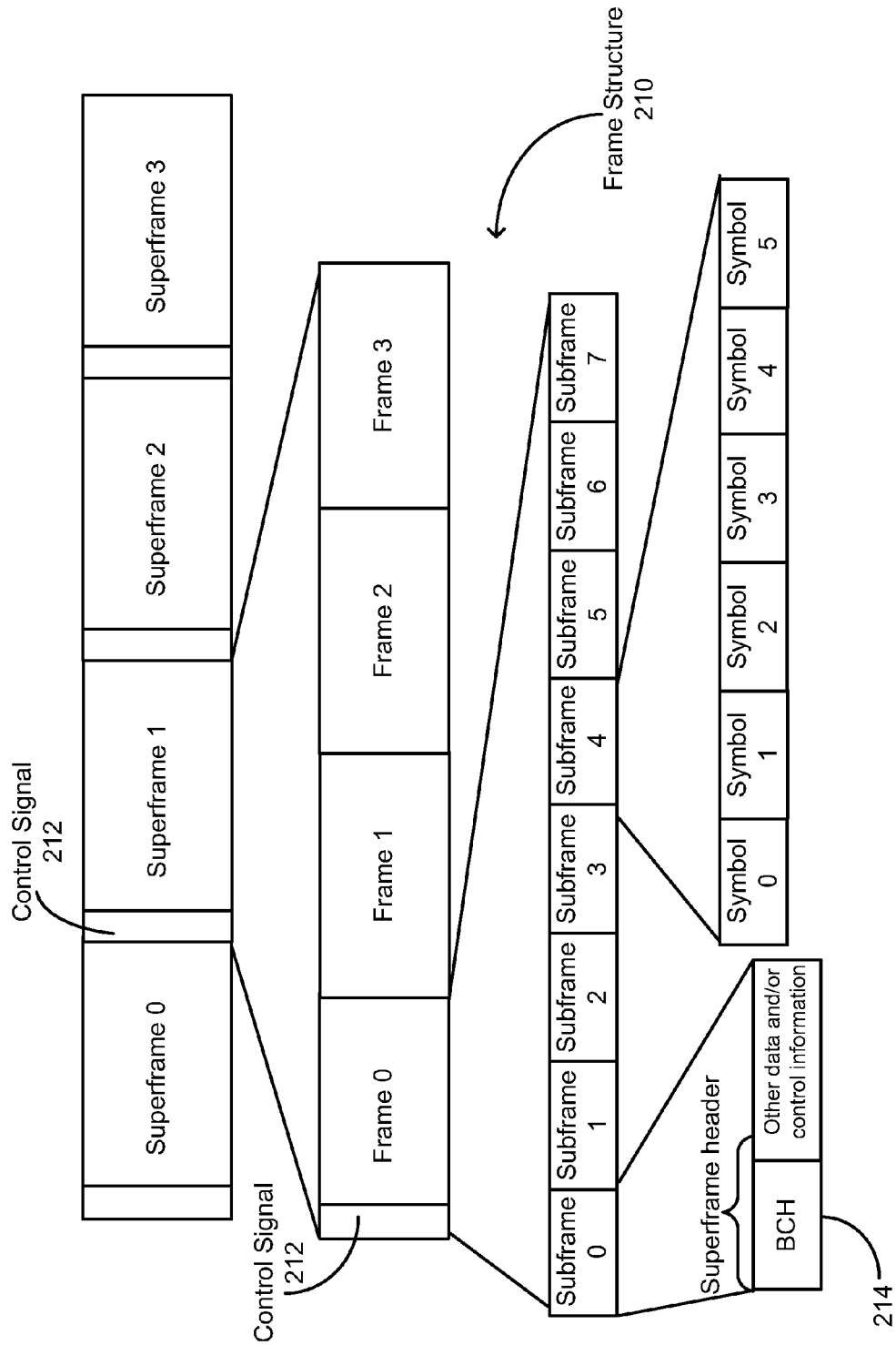
FIG. 2 is a diagram illustrating a frame structure according to an example embodiment.

FIG. 2 is a diagram illustrating a frame structure 210 according to an example embodiment. As shown in FIG. 2, several superframes are shown, including superframe 0, superframe 1, superframe 2, superframe 3, .... Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols (or other number of OFDM symbols), depending on a type of the subframe. These are merely examples, and a subframe may include any number of resources or OFDM symbols.

The first frame of each superframe may include a control signal 212. The control signal 212 may include signal control information, a preamble, and/or synchronization information, according to example embodiments.

In an example of TDD (Time Division Duplexing), one carrier frequency may be used for both DL and UL communication with the MS, where each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104. In an example of FDD (Frequency Division Duplexing), two carrier frequencies may be used, where one carrier frequency may be used for DL communication with the MS, while the other carrier frequency may be used for UL communication with the MS. In FDD, all the sub-frame for DL carrier frequency may be used for DL communication while all the sub-frame for UL carrier frequency may be used for UL communication.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0) of the first frame (frame 0) of the superframe. The SFH may include a number of fields, including a broadcast channel (BCH) 214. The BCH 214 may be used by the BS 104 to broadcast to all MSs or provide essential system parameters and system configuration information. The BCH 214 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 214 may be frequency division multiplexed with data within the same subframe (subframe 0).

As noted, BCH 214, e.g., provided within a first subframe of a superframe, may include system configuration information. System configuration information may include or describe the system configuration of one or more (or each) of the subframes of a superframe. In some cases, the system configuration information may be considered essential for decoding subframes. System configuration information may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, each subframe may include other data and control information. Although FIG. 2 only shows the other data and control information for subframe 0, each subframe may include other data and control information. For example, each subframe may include scheduling information that may schedule, assign or allocate resources to each of the MSs for UL or DL transmissions. The scheduling information in a subframe may allocate or assign resources to a MS for the same subframe, or a future subframe, as examples.

In an example embodiment, the scheduling information may be provided in (or as part of) a unicast service control channel or a Map message. These are merely some examples, and the scheduling information may be provided in a number of different formats, or may be known by different names. The scheduling information may include, for example, MS-specific (e.g., user-specific or connection-specific) scheduling assignments to assign or allocate UL or DL resources to different MSs. The scheduling assignments may be for unicast transmissions (either uplink or downlink), or DL multicast or broadcast transmissions (e.g., where a MS may be a member of one or more multicast groups).

For example, the MS-specific scheduling information that identifies UL resources for a MS may identify UL resources (e.g., time slot and/or subcarriers or other resources) assigned or allocated to the MS to allow the MS an opportunity to transmit UL to the BS, e.g., in a same or different subframe of the same frame or a next frame, as examples. Similarly, the MS-specific scheduling information that assigns DL resources to a MS may identify resources (e.g., time slot and/or subcarriers) within a current subframe or a future subframe (e.g., next subframe) for which the BS will transmit data to the MS.

Returning to FIG. 1, the mobile stations 106, 108, 110 may each respectively switch between an active state and an idle state. The active state may consume more power than the idle state. In active state, the mobile stations 106, 108, 110 may be exchanging data with the base station 104, such as by transmitting data to the base station 104 in the uplink direction and/or receiving data from the base station 104 in the downlink direction.

In the idle state, the mobile stations 106, 108, 110 may not exchange data with the base station 104. The mobile stations 106, 108, 110 may switch between a paging unavailable mode and a paging available mode in the idle state. The paging available mode may consume more power than the paging unavailable mode. In the paging unavailable mode, the mobile stations 106, 108, 110 may not receive or decode messages from the base station 104 or other wireless nodes, and may wait until a predetermined interval has elapsed to switch to either the paging available mode of the idle state or the active state. In the paging available mode of the idle state, the mobile stations 106, 108, 110 may receive and decode paging indicators and/or paging messages from the base station 104.

The base station 104 may send a paging indicator to the mobile stations 106, 108, 110, indicating whether the base station 104 will send a paging message to the mobile stations 106, 108, 110 during a subsequent paging available mode of the mobile stations 106, 108, 110. The paging indicator may indicate a paging group or MS group for which the paging message will be sent. The mobile stations 106, 108, 110 may be organized into paging groups. Each mobile station 106, 108, 110 may be assigned to a paging group, and may be associated with a paging group identifier (PGID), according to an example embodiment. The paging group may include mobile stations 106, 108, 110 located within a "paging area," which may include a group of contiguous cells served by separate base stations 104 or relay stations; a mobile station 106, 108, 110 may be assigned a new PGID upon moving into a cell which is part of a different paging area.

The mobile stations 106, 108, 110 may determine whether to switch to the paging available mode during a subsequent predetermined time based on whether the paging indicator includes their respective PGID, according to an example embodiment. In another example embodiment, no paging indicator may be sent, and the mobile stations 106, 108, 110 may periodically switch to the paging available mode at the predetermined time.

The base station 104 may send a paging message to the mobile stations 106, 108, 110. The base station 104 may broadcast the paging message to all mobile stations 106, 108, 110 within range of the base station. The base station 104 may, for example, send a paging indicator periodically, such as once every twenty millisecond (20 ms) superframe or during the mobile stations' 106, 108, 110 paging available mode. The base station 104 may, for example, send the paging message to one or more of the mobile stations 106, 108, 110 when the base station 104 wants the mobile station(s) 106, 108, 110 to be paged for a mobile station 106, 108, 110 terminated call, or for DL traffic, or some other reason. The base station 104 may send the paging message at a same time as neighboring base stations (not shown) in neighboring cells (not shown) within a paging area (not shown) send paging messages to mobile stations (not shown) in their respective cells.

The paging message may identify the mobile station(s) 106, 108, 110 with which the base station 104 will engage in active communication. The paging message may identify the mobile station(s) 106, 108, 110 by a mobile station specific identifier which may uniquely identify the mobile station(s) 106, 108, 110. The base station 104 may have previously assigned the mobile station specific identifiers to the respective mobile stations 106, 108, 110 by sending an address assignment message to the mobile stations 106, 108, 110. The address assignment message may have been one message which includes mobile station specific identifiers for each of the mobile stations 106, 108, 110, or the base station 104 may have sent a separate address assignment message to each of the mobile stations 106, 108, 110, according to example embodiments. The mobile stations specific identifiers may include temporary medium access control (MAC) addresses or temporary mobile station identifiers (MSIDs), according to example embodiments.

During the paging available mode, the mobile stations 106, 108, 110 may receive and decode paging messages from the base station 104. The mobile stations 106, 108, 110 may determine whether a paging message identifies the respective mobile station 106, 108, 110. If a mobile station 106, 108, 110 determines that the paging message does identify the respective mobile station 106, 108, 110, the mobile station 106, 108, 110 may, based on determining that the paging message identifies the mobile station 106, 108, 110, switch from the idle state to an active state an offset time after the paging message was received. The offset time after the paging message was received may be measured directly based on a time difference after the paging message was received, calculated based on a number of frames or subframes after the paging message was received, or calculated based on a number of frames or subframes after the paging message was sent, according to example embodiments.

The offset time may be based on an identifier of the mobile station 106, 108, 110. The identifier may include, for example, the paging group identifier (PGID) associated with the mobile station 106, 108, 110, a permanent or temporary medium access control (MAC) address of the mobile station 106, 108, 110, a temporary mobile station identifier (MSID) of the mobile station 106, 108, 110, or hash algorithms thereof, according to example embodiments. The mobile station(s) 106, 108, 110 may initialize network entry into the network 102 by sending ranging request messages to the mobile station, after the offset time has elapsed, such as upon switching to the active state, or after going through substages such as initialization or access, according to example embodiments. Because the offset times for the mobile stations 106, 108, 110 may be based on the identifiers associated with the respective mobile stations 106, 108, 110, and the identifiers for the mobile stations 106, 108, 110 may be different from each other, the offset times may be different for each mobile station 106, 108, 110, or for each paging group of mobile stations 106, 108, 110; the mobile stations 106, 108, 110 or paging groups of mobile stations 106, 1088, 110 may send their ranging request messages at different times, according to an example embodiment. By sending their ranging request messages at different times, the mobile stations 106, 108, 110 may reduce collisions and delays in the network re-entry procedure, and avoid wasting bandwidth by not making unnecessary re-ranging attempts.

The base station 104 may know the identifier associated with the paged mobile station(s) 106, 108, 110, and therefore may know when the paged mobile station(s) 106, 108, 110 will send their ranging request messages. The base station 104 may listen for the ranging request messages from the respective mobile station(s) 106, 108, 110 at the respective offset time(s). The base station 104 may, in response to receiving the ranging request messages from the respective mobile station(s) 106, 108, 110, send ranging response messages to the respective mobile station(s) 106, 108, 110, continuing the network re-entry procedure.

Figure 3A:
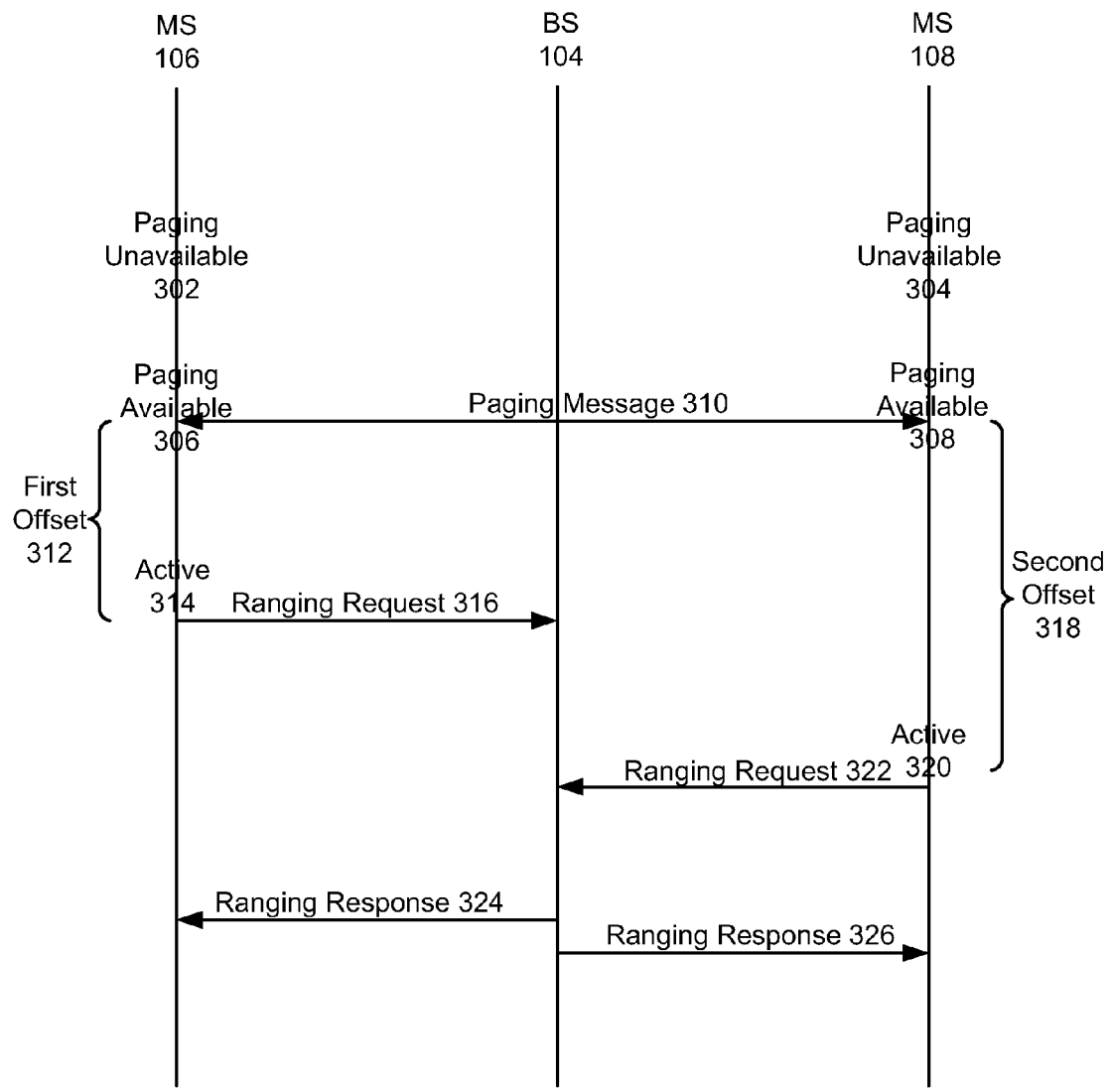
FIG. 3A is a timing diagram showing the base station page two mobile stations according to an example embodiment.

FIG. 3A is a timing diagram showing the base station 104 page two mobile stations 106, 108 according to an example embodiment. While two mobile stations 106, 108 are shown in FIG. 3A, any number of mobile stations may be paged. The base station 104 may, for example, send a paging message to all mobile stations within range of the base station 104, and may send the paging message at a same time as other base stations within a same paging area as the base station 104.

The mobile stations 106, 108 may each begin in a paging unavailable mode 302 of an idle state. In the paging unavailable mode 302, 304, the mobile stations 106, 108 may not receive, decode, or process messages or data. In accordance with a predetermined schedule known to the mobile stations 106, 108 and the base station 104, the mobile stations 106, 108 may switch from the paging unavailable mode 302, 304 to a paging available mode 306, 308 of the idle state. The paging available mode 306, 308 may allow the mobile stations 106, 108 to listen to, decode, and process messages received from the base station 104, but not to send messages to the base station 104.

In this example, the base station 104 may send a paging message 310 to a mobile station 106, or to a plurality of mobile stations 106, 108, during the paging available mode 306, 308. The base station 104 may, for example, broadcast the paging message 310 to all mobile stations 106, 108, 110 within range of the base station 104. The paging message 310 may identify one, two, or any number of the mobile stations 106, 108. The mobile station(s) 106, 108 may determine that the paging message 310 identifies the respective mobile station(s) 106, 108. Based on determining that the paging message 310 identifies the mobile station 106, 108, the mobile station 106, 108 may switch from the idle state (which includes the paging unavailable mode 302, 304 and the paging available mode 306, 308) to an active state 314, 320. The mobile station 106, 108 may switch to the active state 314, 320 after an offset time 312, 318 has elapsed. The offset time 312, 318 may be based, at least in part, on an identity of the mobile station 106, 108. The identity upon which the offset time 312, 318 is based may or may not be the same as the identity included in the paging message 310.

In the example shown in FIG. 3A, the mobile station 106 may switch to the active state 314 after a first offset time 312. In the "active state," as used in this disclosure, the mobile station 106 is able to send messages to the base station 104, such as ranging request messages. The active state may include an access state, a connected state, and/or an active mode, according to example embodiments. The first offset time 312 may be based on the mobile station's 106 identity. After switching to the active state 314, the mobile station 106 may send a ranging request message 316 to the base station 104. The base station 104 may, in response to receiving the ranging request message 316, send a ranging response message 324 to the mobile station 106. The mobile station 106 may remain in the active state 314 during the exchange of ranging request 316 and ranging response 324 messages, according to an example embodiment.

Also in the example shown in FIG. 3A, the mobile station 108 may switch to the active state 320 after a second offset time 318. The second offset time 318 may be based on the mobile station's 108 identity. After switching to the active state 320, the mobile station 108 may send a ranging request message 322 to the base station 104. The base station 104 may, in response to receiving the ranging request message 322, send a ranging response message 326 to the mobile station 106. The mobile station 106 may remain in the active state 320 during the exchange of ranging request 322 and ranging response 326 messages, according to an example embodiment.

Figure 3B:
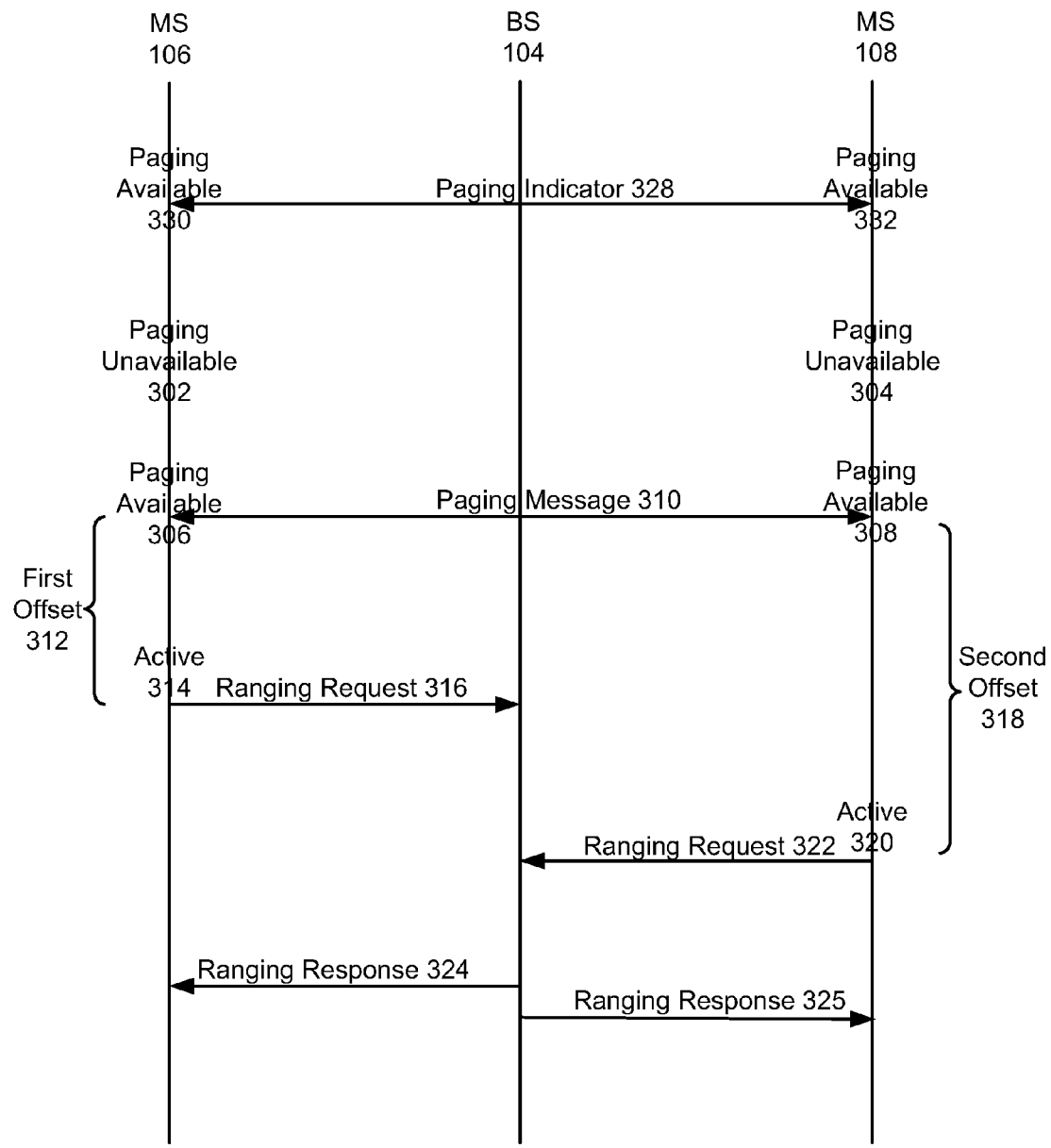
FIG. 3B is a timing diagram showing the base station page two mobile stations according to another example embodiment.

FIG. 3B is a timing diagram showing the base station 104 page two mobile stations 106, 108 according to another example embodiment. In this example, before the base station 104 sends the paging message 310 to the mobile stations 106, 108, the base station 104 may send a paging indicator 328 to any or all of the mobile stations 106, 108 within range. The base station 104 may send the paging indicator 328 to the mobile stations 106, 108 during a paging available mode 330, 332 of the mobile stations 106, 108. The paging indicator 328 may indicate whether the base station 104 will send the paging message 310 to the mobile station(s) 106, 108. The paging indicator 328 or paging message 310 may also indicate the offset times 312, 318 for the respective mobile stations 106, 108, according to an example embodiment.

After receiving the paging indicator 328, the mobile stations 106, 108 may return to their respective paging unavailable modes 302, 304 of the idle state. If the paging indicator 328 indicated that the base station 104 would send the paging message 310 to the respective mobile stations 106, 108, the respective mobile stations 106, 108 may switch to the paging available mode 306, 308, as described above with reference to FIG. 3A, and may perform other functions as described above with reference to FIG. 3A.

Figure 4:
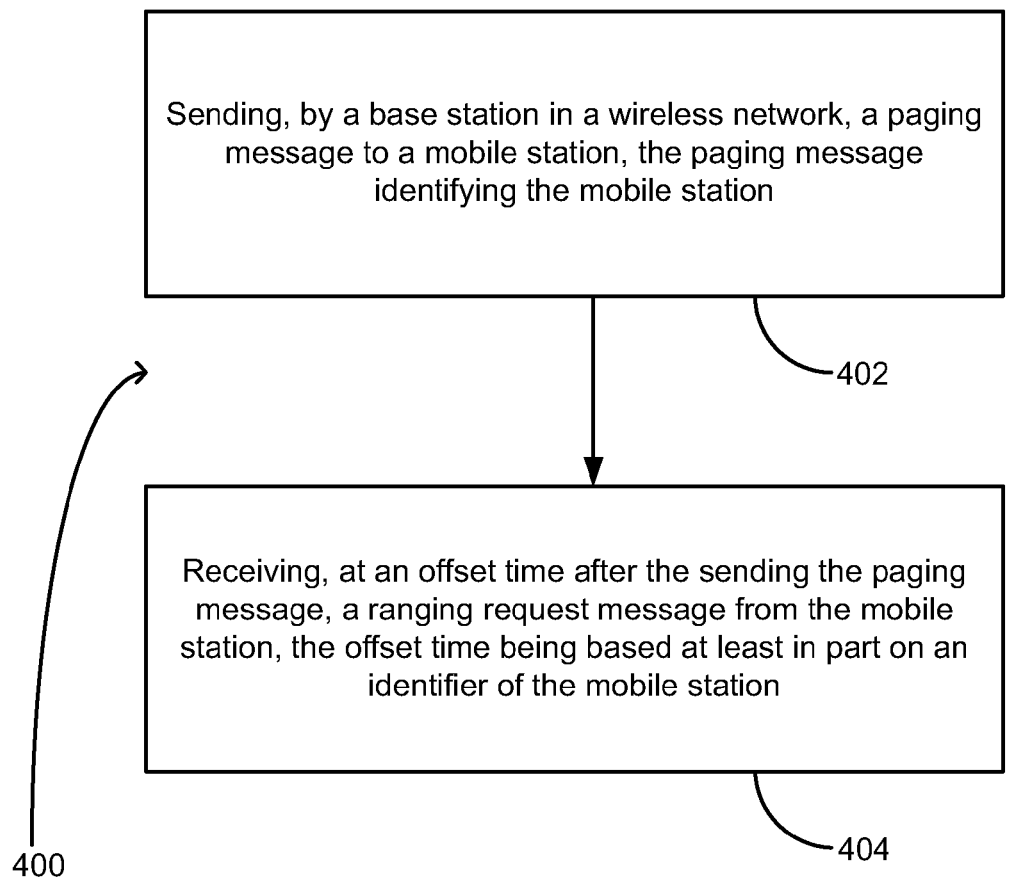
FIG. 4 is a flowchart showing a method according to an example embodiment.

FIG. 4 is a flowchart showing a method 400 according to an example embodiment. In this example, the method 400 may include sending, by a base station in a wireless network, a paging message to a mobile station, the paging message identifying the mobile station (402). The method 400 may also include receiving, at an offset time after the sending the paging message, a ranging request message from the mobile station, the offset time being based at least in part on an identifier of the mobile station (404).

In an example embodiment, the sending (402) may include sending the message to a plurality of mobile stations, the paging message identifying at least a first mobile station and a second mobile station from the plurality of mobile stations. In this example, the receiving (404) may include receiving a first ranging request message from the first mobile station at a first offset time after the sending the paging message and a second ranging request message from the second mobile station at a second offset time after the sending the paging message, the first offset time being based on an identifier of the first mobile station and the second offset time being based on an identifier of the second mobile station.

In an example embodiment, the sending the paging message (402) may include sending the paging message to the mobile station during a paging available mode of an idle state of the mobile station.

In an example embodiment, the sending (402) may include sending the paging message to the mobile station, the paging message identifying the mobile station by a paging group identifier (PGID).

In an example embodiment, the sending (402) may include sending only a single paging message to the plurality of mobile stations per twenty millisecond (20 ms) superframe.

In an example embodiment, the sending (402) may include sending the paging message to the mobile station at a same time as a plurality of neighboring base stations within a paging area send paging messages to mobile stations served by the neighboring base stations.

In an example embodiment, the receiving (404) may include receiving, at the offset time after the sending the paging message, the ranging request message from the mobile station, the offset time being based at least in part on a hashing algorithm of a medium access control (MAC) address of the mobile station.

In an example embodiment, the receiving (404) may include receiving, at the offset time after the sending the paging message, the ranging request message from the mobile station, the offset time being based at least in part on a hashing algorithm of a paging group identifier (PGID) of the mobile station.

In an example embodiment, the receiving (404) may include receiving, at the offset time after the sending the paging message, the ranging request message from the mobile station, the offset time being based at least in part on a hashing algorithm of a mobile station identifier (MSID) of the mobile station.

In an example embodiment, the sending (402) and receiving (404) may each include sending and receiving during subframes which include either five, six, or seven orthogonal frequency division multiplexing (OFDM) symbols.

In an example embodiment, the method 400 may further comprise sending an address assignment message to the mobile station, the address assignment message including a temporary medium access control (MAC) address for identifying the mobile station.

In an example embodiment, the method 400 may further comprise sending a ranging response message to the mobile station in response to receiving the ranging request message from the mobile station.

In an example embodiment, the method 400 may further comprise sending a paging indicator to the mobile station, the paging indicator indicating whether the base station will send the paging message to the mobile station. In this example, the sending the paging message includes sending the paging message to the mobile station during a paging available interval of an idle state of the mobile station.

In an example embodiment, the method 400 may further comprise periodically sending a control signal to the plurality of mobile stations at a beginning of a twenty millisecond (20 ms) superframe.

In an example embodiment, the wireless network may include an IEEE 802.16 Worldwide Interoperability for Microwave Access (WiMAX) network.

Figure 5:
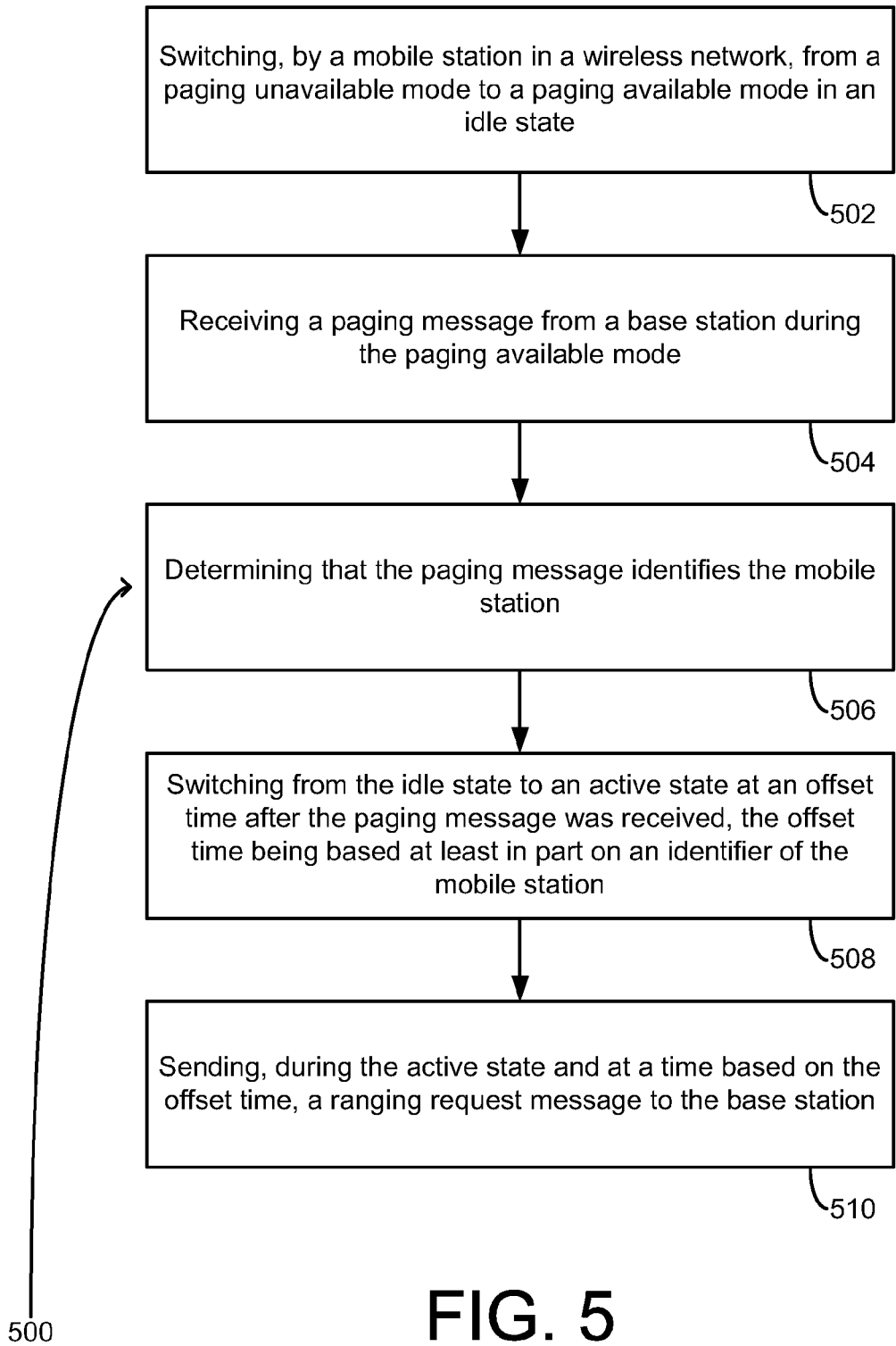
FIG. 5 is a flowchart showing a method according to another example embodiment.

FIG. 5 is a flowchart showing a method 500 according to another example embodiment. In this example, the method 500 may include switching, by a mobile station in a wireless network, from a paging unavailable mode to a paging available mode in an idle state (502). The method 500 may also include receiving a paging message from a base station during the paging available mode (504). The method 500 may also include determining that the paging message identifies the mobile station (506). The method 500 may also include switching from the idle state to an active state at an offset time after the paging message was received, the offset time being based at least in part on an identifier of the mobile station (508). The method 500 may also include sending, during the active state and at a time based on the offset time, a ranging request message to the base station (510).

In an example embodiment, the receiving (504) may include receiving the paging message from the base station, the paging message identifying the mobile station by a paging group identifier (PGID) and a mobile station identifier, both of which are associated with the mobile station. In this example, the determining (506) may include determining that the paging message includes the PGID.

In an example embodiment, the receiving (504) may include receiving the paging message from the base station during the paging available mode, the paging message being broadcast to a plurality of other mobile stations served by the base station.

In an example embodiment, the receiving (504) may include receiving the paging message at a same time as a plurality of other mobile stations receive paging messages, the plurality of other mobile stations being located in different cells than the mobile station but being in a same paging area as the mobile station.

In an example embodiment, the sending (510) may include sending, at the offset time after the receiving the paging message, the ranging request message, the offset time being based at least in part on a hashing algorithm of a medium access control (MAC) address of the mobile station.

In an example embodiment, the sending (510) may include sending, at the offset time after the receiving the paging message, the ranging request message, the offset time being based at least in part on a hashing algorithm of a mobile specific identifier (MSID) associated with the mobile station.

In an example embodiment, the sending (510) may include sending, at the offset times after the receiving the paging message, the ranging request message, the offset time being based at least in part on a hashing algorithm of a paging group identifier (PGID) the mobile station.

In an example embodiment, the receiving (504) and sending (510) may each include receiving and sending during subframes which include either five, six, or seven orthogonal frequency division multiplexing (OFDM) symbols.

In an example embodiment, the method 500 may further comprise receiving an address assignment message from the base station, the address assignment message including a temporary medium access control (MAC) address for identifying the mobile station.

In an example embodiment, the method 500 may further comprise receiving a ranging response message from the base station in response to sending the ranging request message to the base stations.

In an example embodiment, the method 500 may further comprise receiving a paging indicator from the base station, the paging indicator indicating whether the base station will send the paging message. In this example, the switching includes switching from the paging unavailable mode to the paging available mode based at least in part on the paging indicator indicating that the base station will send the paging message. Also in this example, the receiving the paging message includes receiving the paging message from the base station during a paging available interval of an idle state of the mobile station.

In an example embodiment, the method 500 may further comprise periodically receiving a control signal from the base station at a beginning of a twenty millisecond (20 ms) superframe.

In an example embodiment, the wireless network may include an IEEE 802.16 Worldwide Interoperability for Microwave Access (WiMAX) network.

Figure 6:
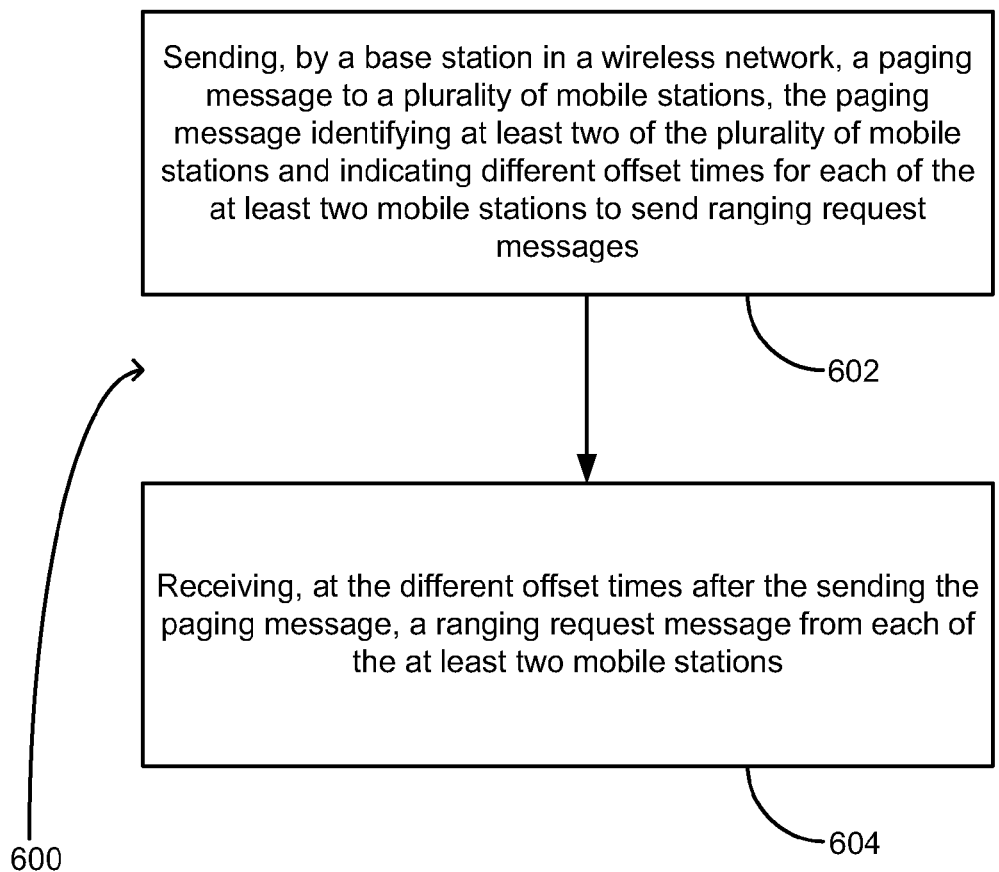
FIG. 6 is a flowchart showing a method according to another example embodiment.

FIG. 6 is a flowchart showing a method 600 according to another example embodiment. In this example, the method 600 may include sending, by a base station in a wireless network, a paging message to a plurality of mobile stations, the paging message identifying at least two of the plurality of mobile stations and indicating different offset times for each of the at least two mobile stations to send ranging request messages (602). The method 600 may also include receiving, at the different offset times after the sending the paging message, a ranging request message from each of the at least two mobile stations (604).

Figure 7:
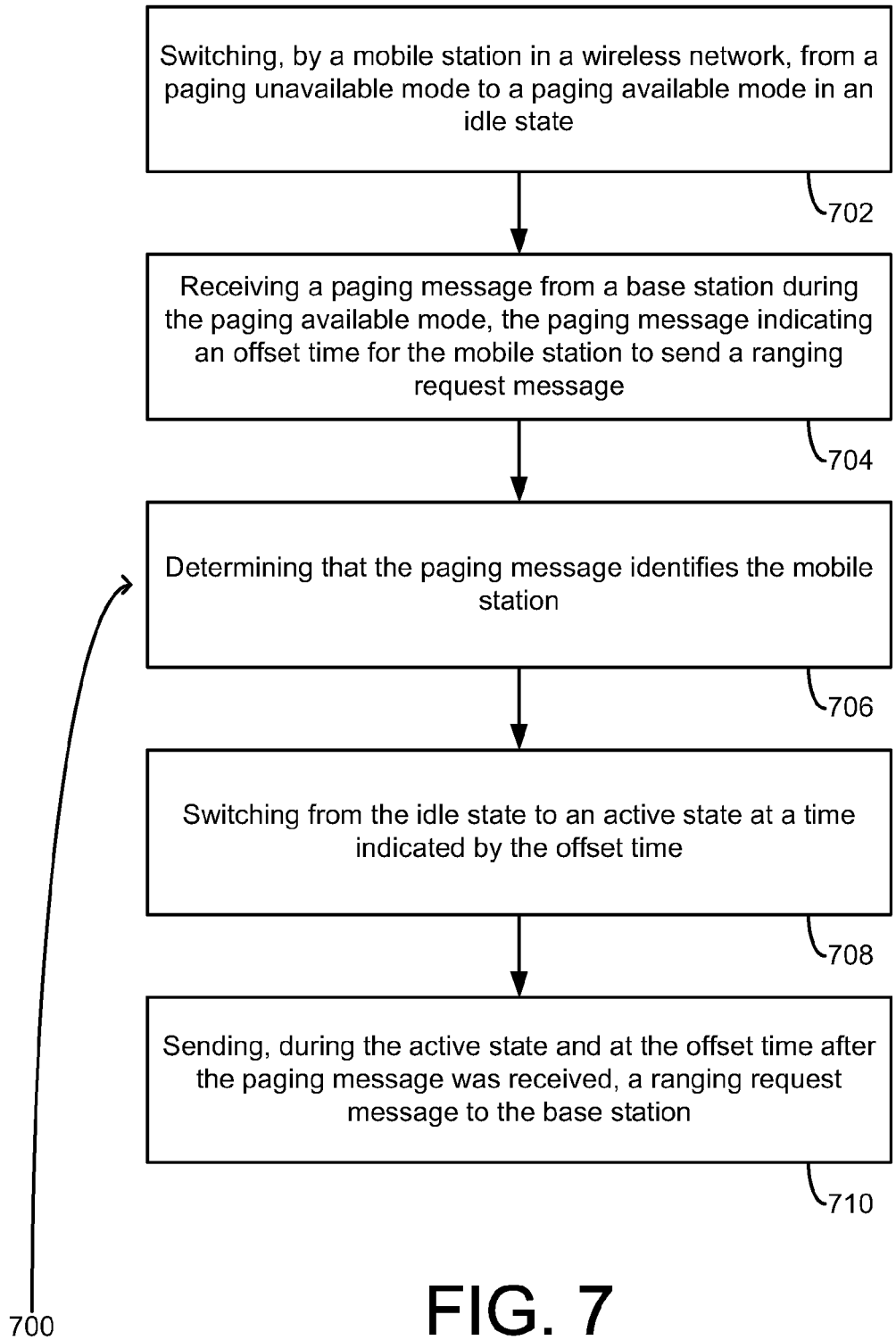
FIG. 7 is a flowchart showing a method according to another example embodiment.

FIG. 7 is a flowchart showing a method 700 according to another example embodiment. In this example, the method 700 may include switching, by a mobile station in a wireless network, from a paging unavailable mode to a paging available mode in an idle state (702). The method 700 may also include receiving a paging message from a base station during the paging available mode, the paging message indicating an offset time for the mobile station to send a ranging request message (704). The method 700 may also include determining that the paging message identifies the mobile station (706). The method 700 may also include switching from the idle state to an active state at a time indicated by the offset time (708). The method 700 may also include sending, during the active state and at the offset time after the paging message was received, a ranging request message to the base station (710).

Figure 8:
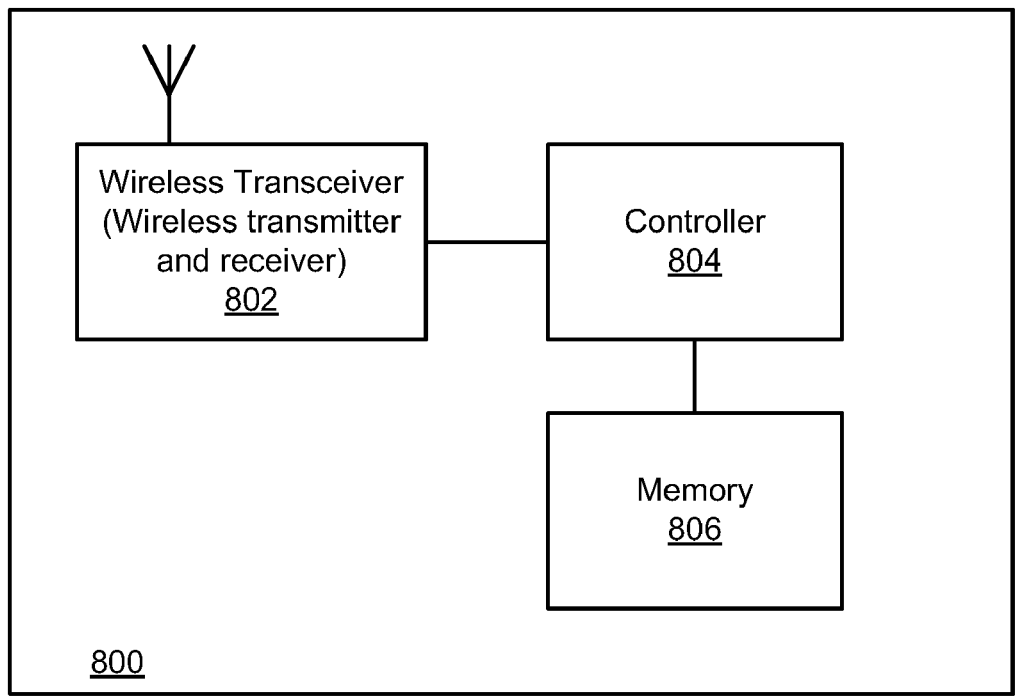
FIG. 8 is a block diagram of an apparatus according to an example embodiment.

FIG. 8 is a block diagram of a wireless station (or wireless node) 800 according to an example embodiment. The wireless station 800 (e.g. base station 104 or mobile node 106, 108, 110) may include, for example, a wireless transceiver (or wireless interface) 802, including a transmitter to transmit signals and a receiver to receive signals, a controller 804 to control operation of the station and execute instructions or software, and a memory 806 to store data and/or instructions. Controller 804 may also make decisions or determinations, generate frames or messages for transmission, decode received frames or messages for further processing, and other tasks or functions described herein.

Controller 804 may be programmable and capable of executing software or other instructions stored in the memory 806 or on other computer storage media to perform the various tasks and functions described above, such as one or more of the tasks or methods described above.

In addition, a storage medium may be included in the memory 806 and may include stored instructions, which when executed by the controller 804 or processor may result in the controller 804, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   sending, by a base station in a wireless network, a paging indicator to a mobile station, the paging indicator indicating whether the base station will send a paging message to the mobile station;
   sending the paging message to the mobile station during a paging available interval of an idle state of the mobile station, the paging message identifying the mobile station; and
   receiving, at an offset time after the sending the paging message, a ranging request message from the mobile station, the offset time being based at least in part on an identifier of the mobile station.

2. The method of claim 1, wherein:
   the sending the paging message includes sending the paging message to a plurality of mobile stations, the paging message identifying at least a first mobile station and a second mobile station from the plurality of mobile stations; and
   the receiving includes receiving a first ranging request message from the first mobile station at a first offset time after the sending the paging message and a second ranging request message from the second mobile station at a second offset time after the sending the paging message, the first offset time being based on an identifier of the first mobile station and the second offset time being based on an identifier of the second mobile station.

3. The method of claim 1, wherein the sending the paging message includes sending the paging message to the mobile station, the paging message identifying the mobile station by a paging group identifier (PGID).

4. The method of claim 1, wherein the sending the paging message includes sending only a single paging message to the plurality of mobile stations per twenty millisecond (20 ms) superframe.

5. The method of claim 1, wherein the sending the paging message includes sending the paging message to the mobile station at a same time as a plurality of neighboring base stations within a paging area send paging messages to mobile stations served by the neighboring base stations.

6. The method of claim 1, wherein the receiving includes receiving, at the offset time after the sending the paging message, the ranging request message from the mobile station, the offset time being based at least in part on a hashing algorithm of a medium access control (MAC) address of the mobile station.

7. The method of claim 1, wherein the receiving includes receiving, at the offset time after the sending the paging message, the ranging request message from the mobile station, the offset time being based at least in part on a hashing algorithm of a paging group identifier (PGID) of the mobile station.

8. The method of claim 1, wherein the receiving includes receiving, at the offset time after the sending the paging message, the ranging request message from the mobile station, the offset time being based at least in part on a hashing algorithm of a mobile station identifier (MSID) of the mobile station.

9. The method of claim 1, wherein the sending the paging message and receiving the ranging request message each include sending and receiving during subframes which include either five, six, or seven orthogonal frequency division multiplexing (OFDM) symbols.

10. The method of claim 1, further comprising sending an address assignment message to the mobile station, the address assignment message including a temporary medium access control (MAC) address for identifying the mobile station.

11. The method of claim 1, further comprising sending a ranging response message to the mobile station in response to receiving the ranging request message from the mobile station.

12. The method of claim 1, further comprising periodically sending a control signal to the plurality of mobile stations at a beginning of a twenty millisecond (20 ms) superframe.

13. The method of claim 1, wherein the wireless network includes an IEEE 802.16 Worldwide Interoperability for Microwave Access (WiMAX) network.

14. A method comprising:
switching, by a mobile station in a wireless network, from a paging unavailable mode to a paging available mode in an idle state;
receiving, from a base station, a paging indicator, the paging indicator indicating whether the base station will send a paging message to the mobile station;
receiving the paging message from the base station during the paging available mode;
determining that the paging message identifies the mobile station;
switching from the idle state to an active state at an offset time after the paging message was received, the offset time being based at least in part on an identifier of the mobile station;
sending, during the active state and at a time based on the offset time, a ranging request message to the base station.

15. The method of claim 14, wherein:
the receiving the paging message includes receiving the paging message from the base station, the paging message identifying the mobile station by a paging group identifier (PGID) and a mobile station identifier, both of which are associated with the mobile station; and
the determining includes determining that the paging message includes the PGID.

16. The method of claim 14, wherein the receiving the paging message includes receiving the paging message from the base station during the paging available mode, the paging message being broadcast to a plurality of other mobile stations served by the base station.

17. An apparatus comprising:
a controller configured to:
generate a paging message for a plurality of mobile stations, the paging message identifying at least a first mobile station and a second mobile station from the plurality of mobile stations; and
process a first ranging request message received from the first mobile station at a first offset time after the sending the paging message and a second ranging request message from the second mobile station at a second offset time after the sending the paging message, the first offset time being based on an identifier of the first mobile station and the second offset time being based on an identifier of the second mobile station; and
a wireless transceiver configured to send the paging message to the plurality of mobile stations and receive the first ranging request message from the first mobile station and receive the second ranging request message from the second mobile station via an air interface.

* * * * *